United States Patent [19]

Chau

[11] Patent Number: 5,870,087
[45] Date of Patent: Feb. 9, 1999

[54] MPEG DECODER SYSTEM AND METHOD HAVING A UNIFIED MEMORY FOR TRANSPORT DECODE AND SYSTEM CONTROLLER FUNCTIONS

[75] Inventor: Kwok Kit Chau, Los Altos, Calif.

[73] Assignee: LSI Logic Corporation, Milpitas, Calif.

[21] Appl. No.: 748,269

[22] Filed: Nov. 13, 1996

[51] Int. Cl.[6] .................................................. G06T 13/00
[52] U.S. Cl. ............................................................ 345/302
[58] Field of Search ................................... 345/302, 418; 707/101, 102, 103, 104

[56] References Cited

U.S. PATENT DOCUMENTS 5,675,511  10/1997  Prasad et al. ............................. 345/302
5,692,213  11/1997  Goldberg et al. ........................ 345/302
5,767,846   6/1998  Nakamura et al. ...................... 345/302

*Primary Examiner*—Phu K. Nguyen
*Assistant Examiner*—Cliff N. Vo
*Attorney, Agent, or Firm*—Conley, Rose & Tayon; Jeffrey C. Hood

[57] ABSTRACT

An MPEG decoder system and method for performing video decoding or decompression which includes a unified memory for multiple functions according to the present invention. The video decoding system includes transport logic, a system controller, and MPEG decoder logic. The video decoding system of the present invention includes a single unified memory which stores code and data for the transport, system controller and MPEG decoder functions. The single unified memory is preferably a 16 Mbit memory. The MPEG decoder logic includes a memory controller which couples to the single unified memory, and each of the transport logic, system controller and MPEG decoder logic access the single unified memory through the memory controller. The video decoding system implements various frame memory saving schemes, such as compression or dynamic allocation, to more efficiently use the memory. In one embodiment, the memory is not required to store reconstructed frame data during B-frame reconstruction, thus considerably reducing the required amount of memory for this function. Alternatively, the memory is only required to store a portion of the reconstructed frame data. In addition, these savings in memory allow portions of the memory to also be used for transport and system controller functions. The present invention thus provides a video decoding system with reduced memory requirements.

20 Claims, 16 Drawing Sheets

Table 1
MPEG Decoder: Memory Partition

| | L64005 | | Compress Displayed Anchor | |
|---|---|---|---|---|
| | NTSC | PAL | NTSC | PAL |
| frame store (number of frames) | 12,441,600 (3.000) | 12,718,080 (2.556) | 9,538,560 (2.300) | 11,197,440 (2.250) |
| vbv buffer | 1,805,008 | 1,805,008 | 3,610,016 | 3,610,016 |
| video non-instantaneous decode | 430,765 | 520,575 | | |
| video-display sync | 500,000 | 600,000 | | |
| audio buffer | 28,672 | 28,672 | | |
| audio-video latency difference | 19,200 | 23,040 | | |
| audio-display sync | 12,800 | 15,360 | | |
| video transport buffer | 4,096 | 4,096 | | |
| audio transport buffer | 4,096 | 4,096 | | |
| 4ms jitter at 15Mbps | 60,000 | 60,000 | | |
| sub-total for channel buffer | 2,864,637 | 3,060,847 | 4,669,645 | 4,865,855 |
| packet header overhead | 20,000 | 20,000 | | |
| OSD | 675,840 | 808,192 | | |
| sub-total for software & data | 775,139 | 170,097 | 1,873,171 | (114,271) |
| Grand Total | 16,777,216 | 16,777,216 | 14,208,205 | 16,063,295 |
| frame store + channel buffer | 15,306,237 | 15,778,927 | | |

FIG. 6A

Table 1
MPEG Decoder: Memory Partition

| | Compress Anchor & Segment B | | Compress B-Frame | | Compress Anchor & B-Frame | |
|---|---|---|---|---|---|---|
| | NTSC: 3.267 segments 8,778,240 (2.117) | PAL: 40 segments 8,985,600 (1.806) | NTSC 8,570,880 (2.067) | PAL 10,229,760 (2.056) | NTSC 5,667,840 (1.367) | PAL 6,497,280 (1.306) |
| | 3,610,016 | 3,610,016 | | | 3,610,016 | 3,610,016 |
| | 4,669,645 | 4,865,855 | | | 4,669,645 | 4,865,855 |
| | 2,633,491 | 2,097,569 | 4,645,859 | 2,658,417 | 5,743,891 | 4,585,889 |
| | 13,447,885 | 13,851,455 | 11,435,517 | 13,290,607 | 10,337,485 | 11,363,135 |

FIG. 6B

| | bit | |
|---|---|---|
| | NTSC | PAL |
| Video Frames (incl. compressed) | 10,583,248 | 10,790,608 |
| VBV Buffer | 1,805,008 | 1,805,008 |
| Video Decode Buffer | 430,765 | 520,575 |
| Video-Display Sync Buffer | 500,000 | 600,000 |
| Audio Buffer | 28,672 | 28,672 |
| Audio-Video Latency Buffer | 19,200 | 23,040 |
| Audio-Display Sync Buffer | 12,800 | 15,360 |
| Transport Buffer | 8,192 | 8,192 |
| Jitter Buffer (4ms) | 60,000 | 60,000 |
| PES Header Overhead | 20,000 | 20,000 |
| OSD | 675,840 | 808,192 |
| MIPS Code and Data | 2,633,491 | 2,097,569 |

FIG. 9

|  | Bandwidth (Mbyte/sec) | |
| --- | --- | --- |
|  | NTSC | PAL |
| Channel In/Out | 18.82 | 15.98 |
| Motion Compensation | 72.70 | 72.59 |
| Store | 38.29 | 38.23 |
| Display & OSD | 30.38 | 30.38 |
| TOTAL | 160.19 | 157.18 |

- With 16x1M SDRAM running at 100 MHz, Bandwidth Available is 200Mbyte/sec
- Expecting 20Mbyte/sec for MIPS Code and Data

FIG. 10

MPEG DECODER SYSTEM AND METHOD HAVING A UNIFIED MEMORY FOR TRANSPORT DECODE AND SYSTEM CONTROLLER FUNCTIONS

INCORPORATION BY REFERENCE

The following references are hereby incorporated by reference.

The ISO/IEC MPEG specification referred to as ISO/IEC 13818 is hereby incorporated by reference in its entirety.

U.S. patent application Ser. No. 08/654,321 titled "Method and Apparatus for Segmenting Memory to Reduce the Memory Required for Bidirectionally Predictive-Coded Frames" and filed May 28, 1996 is hereby incorporated by reference in its entirety as though fully and completely set forth herein.

U.S. patent application Ser. No. 08/653,845 titled "Method and Apparatus for Reducing the Memory Required for Decoding Bidirectionally Predictive-Coded Frames During Pull-Down" and filed May 28, 1996 is hereby incorporated by reference in its entirety as though fully and completely set forth herein.

U.S. patent application Ser. No. 08/689,300 titled "Method and Apparatus for Decoding B Frames in Video Codecs with Minimal Memory" and filed Aug. 8, 1996 now U.S. Pat. No. 5,818,533, whose inventors are David R. Auld and Kwok Chau, is hereby incorporated by reference in its entirety as though fully and completely set forth herein.

1. Field of the Invention

The present invention relates generally to digital video compression, and more particularly to an MPEG decoder system which includes a single unified memory for MPEG transport, decode and system controller functions.

2. Description of the Related Art

Full-motion digital video requires a large amount of storage and data transfer bandwidth. Thus, video systems use various types of video compression algorithms to reduce the amount of necessary storage and transfer bandwidth. In general, different video compression methods exist for still graphic images and for full-motion video. Intraframe compression methods are used to compress data within a still image or single frame using spatial redundancies within the frame. Interframe compression methods are used to compress multiple frames, i.e., motion video, using the temporal redundancy between the frames. Interframe compression methods are used exclusively for motion video, either alone or in conjunction with intraframe compression methods.

Intraframe or still image compression techniques generally use frequency domain techniques, such as the discrete cosine transform (DCT). Intraframe compression typically uses the frequency characteristics of a picture frame to efficiently encode a frame and remove spatial redundancy. Examples of video data compression for still graphic images are JPEG (Joint Photographic Experts Group) compression and RLE (run-length encoding). JPEG compression is a group of related standards that provide either lossless (no image quality degradation) or lossy (imperceptible to severe degradation) compression. Although JPEG compression was originally designed for the compression of still images rather than video, JPEG compression is used in some motion video applications. The RLE compression method operates by testing for duplicated pixels in a single line of the bit map and storing the number of consecutive duplicate pixels rather than the data for the pixels themselves.

In contrast to compression algorithms for still images, most video compression algorithms are designed to compress full motion video. As mentioned above, video compression algorithms for motion video use a concept referred to as interframe compression to remove temporal redundancies between frames. Interframe compression involves storing only the differences between successive frames in the data file. Interframe compression stores the entire image of a key frame or reference frame, generally in a moderately compressed format. Successive frames are compared with the key frame, and only the differences between the key frame and the successive frames are stored. Periodically, such as when new scenes are displayed, new key frames are stored, and subsequent comparisons begin from this new reference point. It is noted that the interframe compression ratio may be kept constant while varying the video quality. Alternatively, interframe compression ratios may be content-dependent, i.e., if the video clip being compressed includes many abrupt scene transitions from one image to another, the compression is less efficient. Examples of video compression which use an interframe compression technique are MPEG, DVI and Indeo, among others.

MPEG BACKGROUND

A compression standard referred to as MPEG (Moving Pictures Experts Group) compression is a set of methods for compression and decompression of full motion video images which uses the interframe and intraframe compression techniques described above. MPEG compression uses both motion compensation and discrete cosine transform (DCT) processes, among others, and can yield compression ratios of more than 30:1.

The two predominant MPEG standards are referred to as MPEG-1 and MPEG-2. The MPEG-1 standard generally concerns frame data reduction using block-based motion compensation prediction (MCP), which generally uses temporal differential pulse code modulation (DPCM). The MPEG-2 standard is similar to the MPEG-1 standard, but includes extensions to cover a wider range of applications, including interlaced digital video such as high definition television (HDTV).

Interframe compression methods such as MPEG are based on the fact that, in most video sequences, the background remains relatively stable while action takes place in the foreground. The background may move, but large portions of successive frames in a video sequence are redundant. MPEG compression uses this inherent redundancy to encode or compress frames in the sequence.

An MPEG stream includes three types of pictures, referred to as the Intra (I) frame, the Predicted (P) frame, and the Bi-directional Interpolated (B) frame. The I or Intraframes contain the video data for the entire frame of video and are typically placed every 10 to 15 frames. Intraframes provide entry points into the file for random access, and are generally only moderately compressed. Predicted frames are encoded with reference to a past frame, i.e., a prior Intraframe or Predicted frame. Thus P frames only include changes relative to prior I or P frames. In general, Predicted frames receive a fairly high amount of compression and are used as references for future Predicted frames. Thus, both I and P frames are used as references for subsequent frames. Bi-directional pictures include the greatest amount of compression and require both a past and a future reference in order to be encoded. Bi-directional frames are never used as references for other frames.

In general, for the frame(s) following a reference frame, i.e., P and B frames that follow a reference I or P frame, only small portions of these frames are different from the corresponding portions of the respective reference frame. Thus, for these frames, only the differences are captured, compressed and stored. The differences between these frames are typically generated using motion vector estimation logic, as discussed below.

When an MPEG encoder receives a video file, the MPEG encoder generally first creates the I frames. The MPEG encoder may compress the I frame using an intraframe compression technique. The MPEG encoder divides respective frames into a grid of 16×16 pixel squares called macroblocks in order to perform motion estimation/compensation. Thus, for a respective target picture or frame, i.e., a frame being encoded, the encoder searches for an exact, or near exact, match between the target picture macroblock and a block in a neighboring picture referred to as a search frame. For a target P frame the encoder searches in a prior I or P frame. For a target B frame, the encoder searches in a prior or subsequent I or P frame. When a match is found, the encoder transmits a vector movement code or motion vector. The vector movement code or motion vector only includes information on the difference between the search frame and the respective target picture. The blocks in target pictures that have no change relative to the block in the reference picture or I frame are ignored. Thus the amount of data that is actually stored for these frames is significantly reduced.

After motion vectors have been generated, the encoder then encodes the changes using spatial redundancy. Thus, after finding the changes in location of the macroblocks, the MPEG algorithm further calculates and encodes the difference between corresponding macroblocks. Encoding the difference is accomplished through a math process referred to as the discrete cosine transform or DCT. This process divides the macroblock into four sub blocks, seeking out changes in color and brightness. Human perception is more sensitive to brightness changes than color changes. Thus the MPEG algorithm devotes more effort to reducing color data than brightness.

Therefore, MPEG compression is based on two types of redundancies in video sequences, these being spatial, which is the redundancy in an individual frame, and temporal, which is the redundancy between consecutive frames. Spatial compression is achieved by considering the frequency characteristics of a picture frame. Each frame is divided into non-overlapping blocks, and each block is transformed via the discrete cosine transform (DCT). After the transformed blocks are converted to the "DCT domain", each entry in the transformed block is quantized with respect to a set of quantization tables. The quantization step for each entry can vary, taking into account the sensitivity of the human visual system (HVS)} to the frequency. Since the HVS is more sensitive to low frequencies, most of the high frequency entries are quantized to zero. In this step where the entries are quantized, information is lost and errors are introduced to the reconstructed image. Run length encoding is used to transmit the quantized values. To further enhance compression, the blocks are scanned in a zig-zag ordering that scans the lower frequency entries first, and the non-zero quantized values, along with the zero run lengths, are entropy encoded.

When an MPEG decoder receives an encoded stream, the MPEG decoder reverses the above operations. Thus the MPEG decoder performs inverse scanning to remove the zig zag ordering, inverse quantization to de-quantize the data, and the inverse DCT to convert the data from the frequency domain back to the pixel domain. The MPEG decoder also performs motion compensation using the transmitted motion vectors to recreate the temporally compressed frames.

When frames are received which are used as references for other frames, such as I or P frames, these frames are decoded and stored in memory. When a temporally compressed or encoded frame is received, such as a P or B frame, motion compensation is performed on the frame using the prior decoded I or P reference frames. The temporally compressed or encoded frame, referred to as a target frame, will include motion vectors which reference blocks in prior decoded I or P frames stored in the memory. The MPEG decoder examines the motion vector, determines the respective reference block in the reference frame, and accesses the reference block pointed to by the motion vector from the memory.

A typical MPEG decoder includes motion compensation logic which includes local or on-chip memory. The MPEG decoder also includes an external memory which stores prior decoded reference frames. The MPEG decoder accesses the reference frames or anchor frames stored in the external memory in order to reconstruct temporally compressed frames. The MPEG decoder also typically stores the frame being reconstructed in the external memory.

An MPEG decoder system also typically includes transport logic which operates to demultiplex received data into a plurality of individual multimedia streams. An MPEG decoder system also generally includes a system controller which controls operations in the system and executes programs or applets.

Prior art MPEG video decoder systems have generally used a frame store memory for the MPEG decoder motion compensation logic which stores the reference frames or anchor frames as well as the frame being reconstructed. Prior art MPEG video decoder systems have also generally included a separate memory for the transport and system controller functions. It has generally not been possible to combine these memories, due to size limitations. For example, current memory devices are fabricated on an 4 Mbit granularity. In prior art systems, the memory requirements for the transport and system controller functions as well as the decoder motion compensation logic would exceed 16 Mbits of memory, thus requiring 20 or 24 Mbits of memory. This additional memory adds considerable cost to the system.

The amount of memory is a major cost item in the production of video decoders. Thus, it is desired to reduce the memory requirements of the decoder system as much as possible to reduce its size and cost. Since practical memory devices are implemented using particular convenient discrete sizes, it is important to stay within a particular size if possible for commercial reasons. For example, it is desired to keep the memory requirements below a particular size of memory, such as 16 Mb, since otherwise a memory device of 20 or 24 Mb would have to be used, resulting in greater cost and extraneous storage area. As mentioned above, it has heretofore not been possible to combine the memory required for the transport and system controller functions with the memory required for the MPEG decoder logic due to the memory size requirements.

Therefore, a new video decoder system and method is desired which efficiently uses memory and combines the memory subsystem for reduced memory requirements and hence reduced cost.

SUMMARY OF THE INVENTION

The present invention comprises an MPEG decoder system and method for performing video decoding or decompression which includes a unified memory for multiple functions according to the present invention. The video decoding system includes transport logic, a system controller, and MPEG decoder logic. The video decoding system of the present invention includes a single unified memory which stores code and data for the transport logic, system controller and MPEG decoder functions. The single unified memory is preferably a 16 Mbit memory. The present invention thus requires only a single memory, and thus has reduced memory requirements compared to prior art designs.

The video decoding system includes transport logic which operates to demultiplex received data into a plurality of individual multimedia streams. The video decoding system also includes a system controller which controls operations in the system and executes programs or applets. The video decoding system further includes decoding logic, preferably MPEG decoder logic, which performs motion compensation between temporally compressed frames of a video sequence during video decoding or video decompression. The memory includes a plurality of memory portions, including a video frame portion for storing video frames, a system controller portion for storing code and data executable by the system controller, and a transport buffer for storing data used by the transport logic. The MPEG decoder logic preferably includes a memory controller which couples to the single unified memory. Each of the transport logic, system controller, and MPEG decoder logic accesses the single unified memory through the memory controller.

The video decoding system implements various frame memory saving schemes, such as compression or dynamic allocation, to reduce the required amount of frame store memory. Also, in one embodiment, the memory is not required to store reconstructed frame data during motion compensation, thus considerably reducing the required amount of memory for this function. Alternatively, the memory is only required to store a portion of the reconstructed frame data. These savings in memory allow portions of the memory to also be used for transport and system controller functions.

The present invention thus provides a video decoding system with reduced memory requirements.

BRIEF DESCRIPTION OF THE DRAWINGS

A better understanding of the present invention can be obtained when the following detailed description of the preferred embodiment is considered in conjunction with the following drawings, in which:

FIGS. 6a and 6b illustrate a table listing the memory partitions under different display schemes;

FIG. 9 illustrates the memory partitions according to the preferred embodiment of the invention;

FIG. 10 illustrates the estimated memory bandwidth distribution in the preferred embodiment of the invention;

DETAILED DESCRIPTION OF THE PREFERRED EMBODIMENT

Video Compression System

Figure 1:
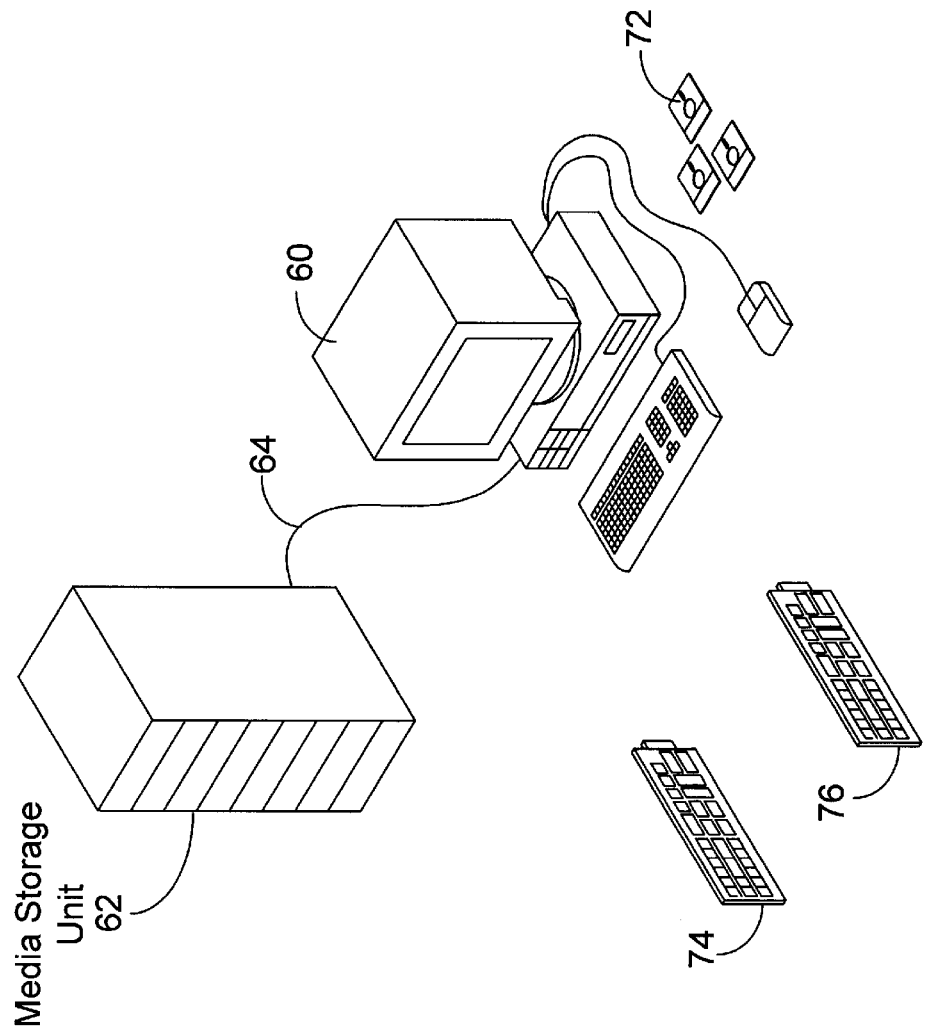
FIG. 1 illustrates a computer system which performs video decoding and which includes a motion compensation logic having a frame memory which stores reference block data according to the present invention.

Referring now to FIG. 1, a system for performing video decoding or decompression and including a unified memory according to the present invention is shown. The video decoding system of the present invention includes a single unified memory which stores code and data for the transport, system controller and MPEG decoder functions. This simplifies the design and reduces the memory requirements in the system.

As shown, in one embodiment the video decoding or decompression system is comprised in a general purpose computer system 60. The video decoding system may comprise any of various types of systems, including a computer system, set-top box, television, or other device.

The computer system 60 is preferably coupled to a media storage unit 62 which stores digital video files which are to be decompressed or decoded by the computer system 60. The media storage unit 62 may also store the resultant decoded or decompressed video file. In the preferred embodiment, the computer system 60 receives a compressed video file or bitstream and generates a normal uncompressed digital video file. In the present disclosure, the term "compressed video file" refers to a video file which has been compressed according to any of various video compression algorithms which use motion estimation techniques, including the MPEG standard, among others, and the term "uncompressed digital video file" refers to a stream of decoded or uncompressed video.

As shown, the computer system 60 preferably includes a video decoder 74 which performs video decoding or decompression operations. The video decoder 74 is preferably an MPEG decoder. The computer system 60 optionally may also include an MPEG encoder 76. The MPEG decoder 74 and MPEG encoder 76 are preferably adapter cards coupled to a bus in the computer system, but are shown external to the computer system 60 for illustrative purposes. The computer system 60 also includes software, represented by floppy disks 72, which may perform portions of the video decompression or decoding operation and/or may perform other operations, as desired.

Figure 2:
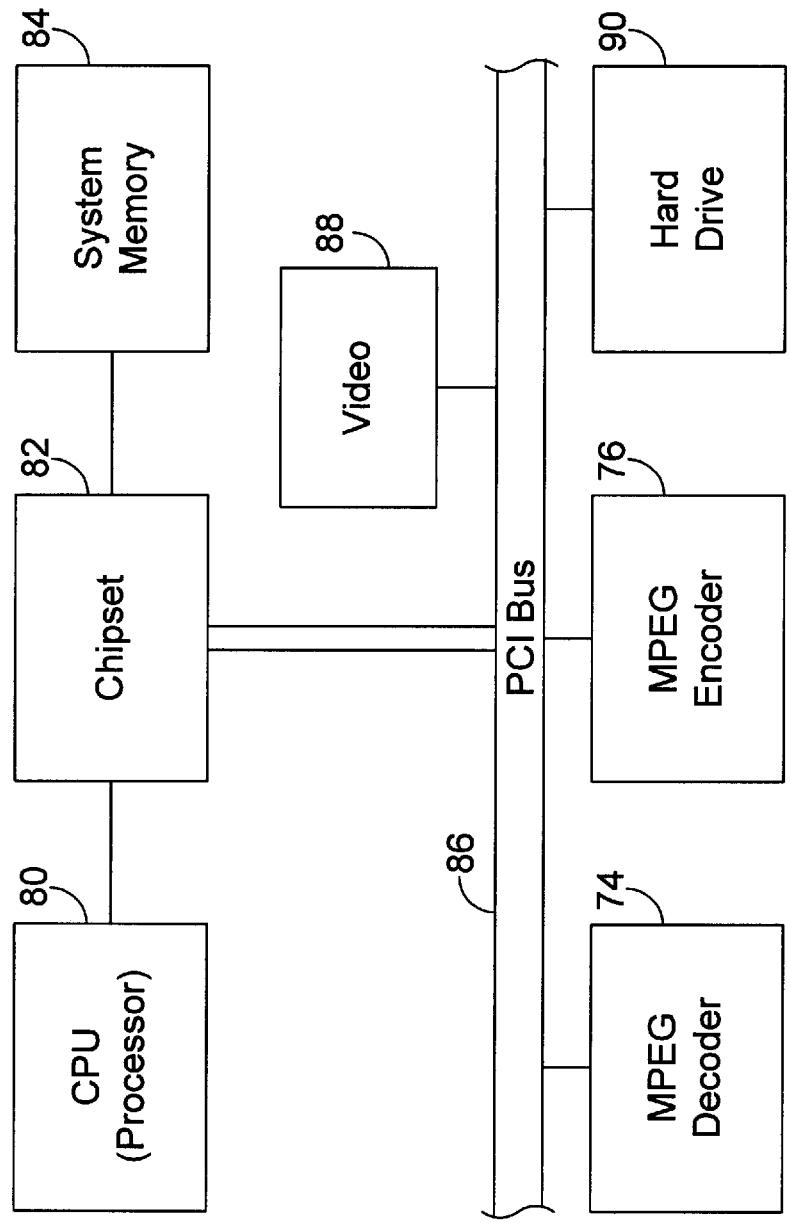
FIG. 2 is a block diagram illustrating the computer system of FIG. 1.

The computer system 60 preferably includes various standard components, including one or more processors, one or more buses, a hard drive and memory. Referring now to FIG. 2, a block diagram illustrating the components comprised in the computer system of FIG. 1 is shown. It is noted that FIG. 2 is illustrative only, and other computer architectures may be used, as desired. As shown, the computer system includes at least one processor 80 coupled through chipset logic 82 to a system memory 84. The chipset 82 preferably includes a PCI (Peripheral Component Interconnect) bridge for interfacing to PCI bus 86, or another type of bus bridge for interfacing to another type of expansion bus. In FIG. 2, MPEG decoder 74 and MPEG encoder 76 are shown connected to PCI bus 86. Various other components may be comprised in the computer system, such as video 88 and hard drive 90.

As mentioned above, in the preferred embodiment of FIG. 1 the computer system 60 includes or is coupled to one or more digital storage or media storage devices. For example, in the embodiment of FIG. 1, the computer system 60 couples to media storage unit 62 through cable 64. The media storage unit 62 preferably comprises a RAID (Redundant Array of Inexpensive Disks) disk array, or includes one or more CD-ROM drives and/or one or more Digital Video Disk (DVD) storage units, or other media, for storing digital video to be decompressed and/or for storing the resultant decoded video data. The computer system may also include one or more internal RAID arrays, CD-ROM drives and/or may couple to one or more separate Digital Video Disk (DVD) storage units. The computer system 60 also may connect to other types of digital or analog storage devices or media, as desired.

Alternatively, the compressed digital video file may be received from an external source, such as a remote storage device or remote computer system. In this embodiment, the computer system preferably includes an input device, such as an ATM (Asynchronous Transfer Mode) adapter card or an ISDN (Integrated Services Digital Network) terminal adapter, or other digital data receiver, for receiving the digital video file. The digital video file may also be stored or received in analog format and converted to digital data, either externally to the computer system 60 or within the computer system 60.

As mentioned above, the MPEG decoder 74 in the computer system 60 performs video decoding or video decompression functions. As discussed further below, the video decoding system includes transport logic which operates to demultiplex received data into a plurality of individual multimedia streams. The video decoding system also includes a system controller which controls operations in the system and executes programs or applets comprised in the stream. The video decoding system further includes decoding logic, preferably MPEG decoder logic, which performs motion compensation between temporally compressed frames of a video sequence during video decoding or video decompression. The video decoding system of the present invention includes a single unified memory which stores code and data for the transport, system controller and MPEG decoder functions. This simplifies the design and reduces the memory requirements in the system. The MPEG decoder 74 thus performs functions with improved efficiency and reduced memory requirements according to the present invention.

It is noted that the system for decoding or decompressing video data may comprise two or more interconnected computers, as desired. The system for decoding or decompressing video data may also comprise other hardware, such as a set top box, either alone or used in conjunction with a general purpose programmable computer. It is noted that any of various types of systems may be used for decoding or decompressing video data according to the present invention, as desired.

Figure 3:
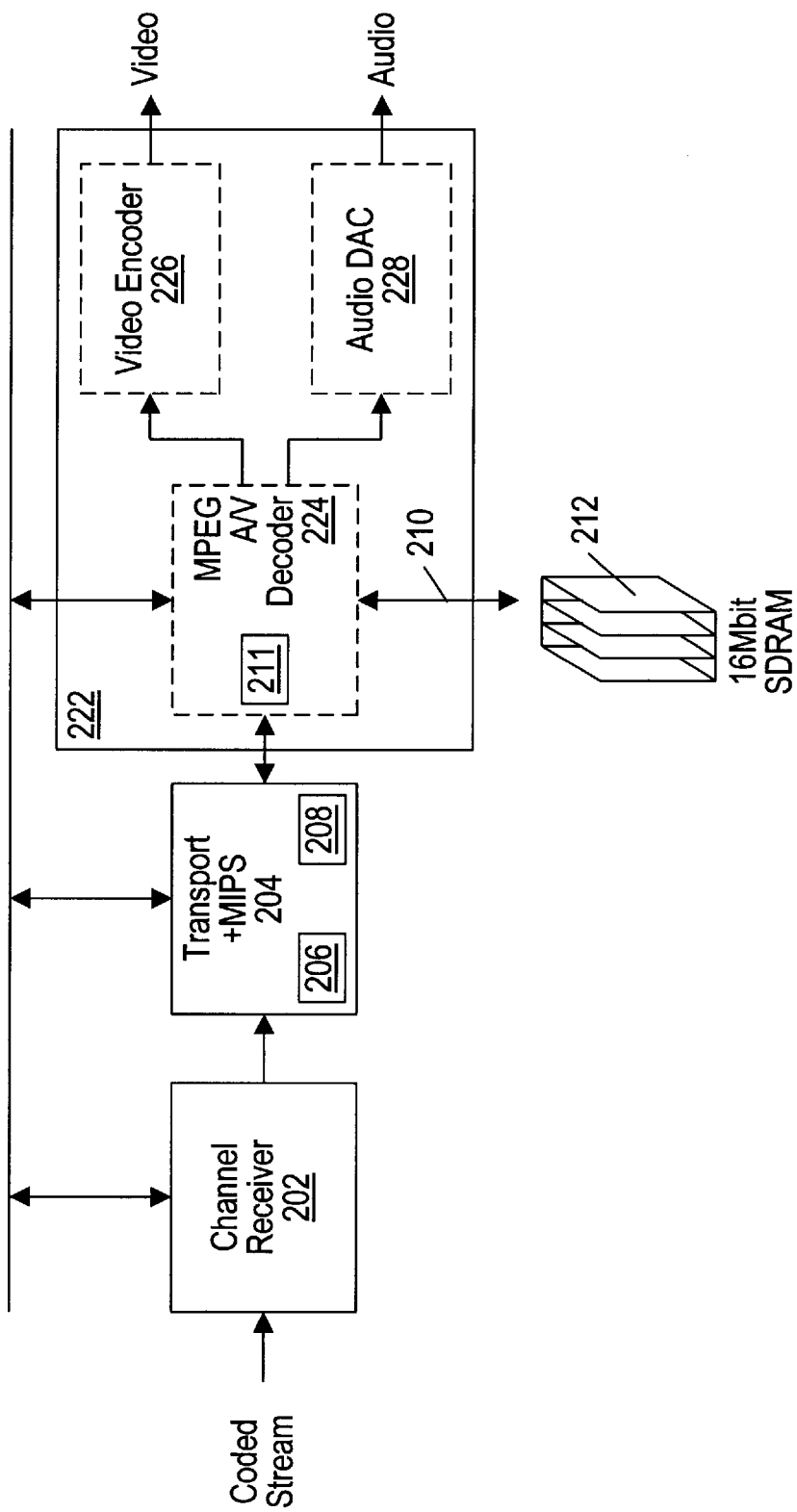
FIG. 3 is a block diagram illustrating an MPEG decoder system including a unified memory for MPEG transport, system controller, and decode functions according to the present invention.

FIG. 3—MPEG Decoder Block Diagram

Referring now to FIG. 3, a block diagram illustrating an MPEG decoder system architecture according to one embodiment of the present invention is shown. As shown, the MPEG decoder system includes a channel receiver 202 for receiving a coded stream. As mentioned above, in the preferred embodiment, the coded stream is an MPEG encoded stream. The MPEG encoded stream may include interactive program content comprised within this stream, as desired. The channel receiver 202 receives the coded stream and provides the coded stream to a transport and system controller block 204.

The transport and system controller block 204 includes transport logic 206 which operates to demultiplex the received MPEG encoded stream into a plurality of multimedia data streams. In other words, the encoded stream preferably includes a plurality of multiplexed encoded channels or multimedia data streams which are combined into a single stream, such as a broadcast signal provided from a broadcast network. The transport logic 206 in the transport and system controller block 204 operates to demultiplex this multiplexed stream into one or more programs, wherein each of the programs comprise individual multimedia data streams including video and/or audio components.

It is noted that the MPEG stream may comprise one of two types of streams including either a transport stream or a program stream. A transport stream comprises a 188 byte stream which includes error correction and which is designed for an error prone environment. A program stream, on the other hand, is designed for an error free environment and this does not include error correction capabilities.

The transport and system controller block 204 also includes a system controller 208 which monitors the MPEG system and is programmable to display audio/graphics on the screen and/or execute interactive applets or programs which are embedded in the MPEG stream. The system controller 208 also preferably controls operations in the MPEG decoder system. In the preferred embodiment, the system controller 208 comprises a MIPS RISC CPU which is programmed to perform system controller functions.

The transport and system controller block 204 couples through a memory controller 211 in MPEG decoder 224 to an external memory 212, also referred to as the single unified memory 212. The transport logic 206 and system controller logic 208 comprised in the transport and system controller block 204 utilize the external memory 212 to store and/or receive code and data. In the preferred embodiment, the external memory 212 is a 16 MB synchronous dynamic random access memory (SDRAM).

As shown, the transport and system controller block 204 couples to an MPEG decoder block 222. The MPEG decoder block 222 includes an MPEG audio visual decoder 224, as shown. The MPEG audio visual decoder 224 receives data from the transport and system controller block 204 and operates to perform MPEG decoding to produce a decoded or decompressed signal. The visual component of the decompressed signal is output from the MPEG A/V decoder 224 and is provided to a video encoder 226. The video encoder 226 operates to convert the digital video stream into a format more appropriate for transmission or display, such as NTSC or PAL format. The video encoder logic 226 includes digital to analog (D/A) converters for converting the decoded digital video stream into an analog stream. This analog video stream is then provided as an output of the system as shown.

The audio component of the decoded or decompressed MPEG stream is provided to an audio digital to analog converter (DAC) 228. The audio DAC 228 operates to perform digital to analog conversion on the digital audio signal output from the MPEG A/V decoder 224. The resulting analog audio signals are provided as an output to the system as shown.

As shown, the external memory 212 is coupled to the MPEG A/V decoder 224. The MPEG A/V decoder 224 includes a memory controller 211 which controls access to the single unified memory 212. As noted above, each of the transport logic 206 and system controller logic 208 comprised in the transport and system controller block 204 access the external memory 212 through the memory controller 211.

The MPEG A/V decoder 224 utilizes the external memory 212 in the MPEG decode process. Thus the MPEG A/V decoder 224 uses the same memory 212 as the transport and system controller blocks. As is well-known in the art, the MPEG A/V decoder 224 uses the external memory 212 to store decoded reference frames or anchor frames which are used during motion compensation or reconstruction of temporally compressed frames. The MPEG A/V decoder 224 may also use the external memory 212 to store a portion or all of the reconstructed frames.

Reconstructed Frame Data Memory Saving Schemes

It is noted that reconstruction of a temporally compressed frame during MPEG decoding typically uses a full 16 MB of external memory. However, the MPEG decoder system 74 of the preferred embodiment uses one or more of various methods to reduce the amount of memory required for storing reconstructed frame data. For example, current prior art video decoder implementations use at least one frame of memory to store the reconstructed B-picture prior to display. In other words, prior art decoders require that there be a full frame store into which to reconstruct the B frame or picture.

In one embodiment of the invention, the video decoder system 74 uses as little as 2.528 frame stores when there is no pulldown during B-frames. In this embodiment, the system uses an improved method to reduce the required amount of memory, whereby the memory used to store the first field is used again for reconstruction as soon as that part of the picture has been displayed. This method reduces the amount of memory needed for B-frame reconstruction to about 0.528 frames. For more information on this method, please see U.S. patent application Ser. No. 08/654,321 titled "Method and Apparatus for Segmenting Memory to Reduce the Memory Required for Bidirectionally Predictive-Coded Frames" and filed May 27, 1996, which is hereby incorporated by reference in its entirety as though fully and completely set forth herein.

In another embodiment of the invention, the video decoder system 74 uses as little as 2.75 frames when there is pulldown. In this embodiment, a method is used to reduce the memory required for decoding and displaying B frames during 3:2 pull-down. This method uses the fact that B frames are not used to predict other frames, so that once the B frame data is retrieved for display, it may be discarded. To enable re-use of memory, data from the top and bottom fields is separated into different segments of memory. Thus, once retrieval begins of the data in a segment, that segment becomes free for reconstruction. However, this initial scheme is not completely sufficient for the top field of every other frame during 3:2 pull-down, since the top field must be somehow made available again for re-display. Rather than requiring additional memory to save the top field of every other frame, the top field is reconstructed again during the period when reconstruction is typically stalled. In this manner, the amount of memory required is reduced, and the field requiring re-display for 3:2 pull-down is simply reconstructed again. For more information on this method for reducing the required amount of memory when pull-down is being performed, please see U.S. patent application Ser. No. 08/653,845 titled "Method and Apparatus for Reducing the Memory Required for Decoding Bidirectionally Predictive-Coded Frames During Pull-Down" and filed May 27, 1996, which is hereby incorporated by reference in its entirety as though fully and completely set forth herein.

The above methods used to reduce memory requirements, which are disclosed in the above-referenced patent applications, are optimal, i.e., use the least possible memory, where the picture is decoded only once. In another embodiment, The MPEG decoder 74 includes frame reconstruction or decoder logic which operates to reconstruct a bi-directionally encoded (B) frame without requiring storage of the frame being constructed in the external memory 112. In this embodiment, the MPEG decoder 74 operates to decode or reconstruct the frame twice, once during each field display period. This obviates the necessity of storing the reconstructed B frame data, thus reducing memory requirements.

In this embodiment, the MPEG decoder system includes a picture reconstruction unit, a picture display unit, a pointer register, and a temporary buffer (all not shown). The picture memory 212 includes separate buffers used for anchor pictures or reference frames (A1, A2) and a rate buffer which stores the temporally compressed frame, referred to as C. The pointer register stores the location of the first byte of the compressed picture, which is stored in the rate buffer. According to this embodiment, the picture memory 212 is not required to store data from the reconstructed frame.

The picture reconstruction unit operates to decode or reconstruct the B frame twice, once each during a first field time and a second field time. The first field time substantially corresponds to the time when the first or top field of the picture is displayed, and the second field time substantially corresponds to the time when the second or bottom field of the picture is displayed.

During the first field time, compressed picture data is read from the rate buffer into the picture reconstruction unit, where the picture is decoded. The top field data from the picture reconstruction unit is written to the temporary buffer, and the bottom field data is discarded. After one slice of the picture has been decoded, the data in the temporary buffer is retrieved by the picture display unit and is output for display. This process continues for the entire picture in order to display all of the first field. Thus, the entire picture is decoded or reconstructed, and only data from the top field is written to the temporary buffer for display.

During the second field time, the same compressed picture is again read from the rate buffer. The picture reconstruction unit again decodes the compressed picture. In the second field time, the picture reconstruction unit writes the bottom field data to the temporary buffer, and the top field data is discarded. After one slice of the picture has been decoded, the data in the temporary buffer is output by the picture display unit for display. This process continues for the entire picture in order to display all of the second field.

The reconstructed picture is never written to the memory during reconstruction of B-frames. It is also noted that the temporary buffer is about 32 times smaller than the external frame store required in the best implementation of prior art methods. This allows the temporary buffer to be comprised on the same monolithic substrate as the decoder itself.

Therefore, in this embodiment the video decoder system reconstructs the B-picture twice, once in each field time. This eliminates the storage requirement of the reconstructed B-frame entirely and thus allows this memory space to be used for transport and system controller functions.

In another embodiment, the MPEG decoder system of the preferred embodiment uses a dynamic segment allocation scheme and/or compression techniques which reduce the external memory requirement. These memory saving techniques are discussed further below.

Therefore, the video decoding system 74 includes transport logic 206 which operates to demultiplex received data into a plurality of individual multimedia streams. The video decoding system also includes a system controller 208 which controls operations in the system and executes programs or applets comprised in the stream. The video decoding system 74 further includes decoding logic 224, preferably MPEG decoder logic, performs motion compensation between temporally compressed frames of a video sequence during video decoding or video decompression. The video decoding system of the present invention includes a single unified memory which stores code and data for the transport, system controller and MPEG decoder functions. This simplifies the design and reduces the memory requirements in the system.

As discussed above, prior art MPEG decoder systems include different memory systems for the transport and system controller logic 204 and the MPEG decoder logic 224. These separate memories are required because of the separate bandwidth and processing requirements for each memory, as well as the memory size requirements of each block. According to the system and method of the present invention, the present invention includes a single or unified memory which is used for each of the transport and system controller block 204 and the MPEG A/V decoder logic 224.

Figure 4:
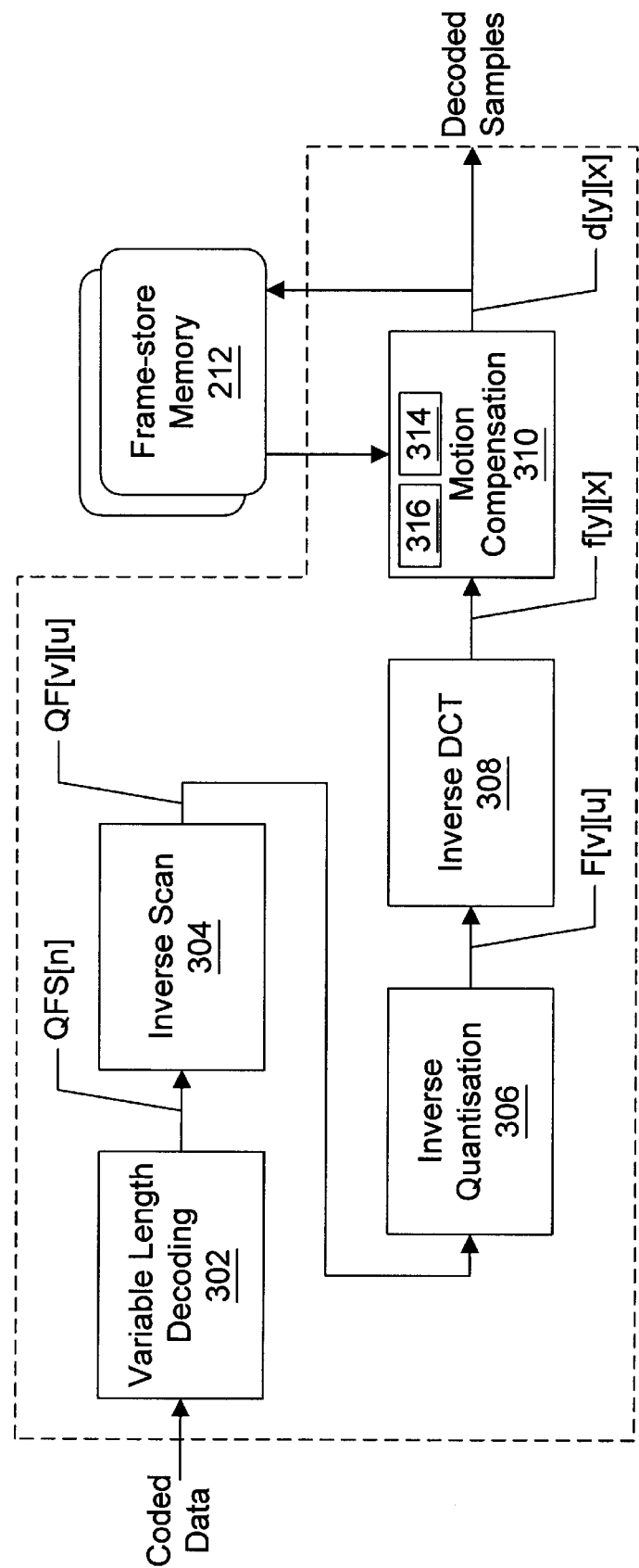
FIG. 4 is a block diagram illustrating the MPEG decoder logic in the system of FIG. 3.

FIG. 4—MPEG Decoder Block Diagram

Referring now to FIG. 4, a block diagram illustrating the MPEG A/V decoder logic 224 in the MPEG decoder 74 which performs motion compensation according to the present invention is shown. As shown, the video decoder logic 224 receives an encoded or compressed digital video stream and outputs an uncompressed digital video stream. The compressed digital video stream is a bitstream of compressed video data which is used to present a video sequence, such as a television segment or movie, onto a screen, such as a television or a computer system. In the preferred embodiment, the compressed digital video stream is compressed using the MPEG-2 compression algorithm, and the video decoder 74 is thus preferably an MPEG-2 decoder. Since the operation of MPEG decoders is well known in the art, details of their operation which are not necessary to the operation of the present invention are omitted for simplicity.

As shown in FIG. 3, the decoder logic 224 comprises a Variable Length Decoding block 302 coupled to provide an output to an Inverse Scan block 304, which is coupled to provide an output to an Inverse Quantization block 306, which is coupled to provide an output to an Inverse DCT block 308, which is coupled to provide an output to a motion compensation block 310. The motion compensation block 310 provides an output comprising decoded samples. A frame store memory 212 is coupled to the output of the motion compensation block 310 to receive and store decoded frame data. The motion compensation block 310 is coupled to an output of the frame store memory 212 to receive reference block data from the frame store memory 212 during motion compensation.

As shown in FIG. 3, the Variable Length Decoding block 302 receives coded data and performs variable length decoding. As is well known, the MPEG standard provides that data is compressed for transmission using variable length codes. Thus the Variable Length Decoding block 302 decodes this data and produces an output, referred to as QFS[n]. The QFS[n] output of the Variable Length Decoding block 302 is provided to the Inverse Scan block 304. The Inverse Scan block 304 reverses the zig zag scan ordering of the received data (is this right) and produces an output referred to as QF[v][u]. The output QF[v][u] is provided to the Inverse Quantization block 306. The Inverse Quantization block 306 performs inverse quantization or de-quantizes the data to produce de-quantized data, referred to as F[v][u]. The output F[v][u] of the Inverse Quantization block 306 is provided to the Inverse DCT block 308, which performs the inverse discrete cosine transform to convert the data from the frequency domain back to the pixel domain. The inverse DCT block 308 produces an output referred to as f[y][x]. The output f[y][x] of the inverse DCT block 308 is provided to the motion compensation block 310.

The output f[y][x] from the inverse DCT block 308 comprises temporally encoded frames of pixel data. The motion compensation block 310 decompresses the temporally compressed frames using motion compensation techniques. As described above, an MPEG encoded stream comprises I, P and B frames. P and B frames are temporally compressed relative to other frames. P frames are temporally compressed relative to prior I or P frames, and B frames are temporally compressed relative to prior or subsequent I or P frames. When a frame is temporally compressed, the frame is partitioned into macroblocks, referred to as target blocks, and then the compression method searches in neighboring frames for blocks which are most similar to the block being encoded. When the best fit block is found, the respective target block is encoded by a motion vector which points to this best fit reference block in the reference frame. The difference between the block being encoded and the best fit block is also computed and transferred in the MPEG stream.

Output pixel values from the motion compensation block 310 are provided to a frame store memory 212. The frame store memory 212 is thus coupled to the motion compensation block 310 and stores one or more reference frames of video data. These reference frames of video data are used in performing motion compensation on temporally compressed frames, such as P and B frames. In general, an MPEG stream includes encoded reference frame data which is transmitted before temporally compressed data that depends on the prior transmitted reference frame data. Thus, incoming temporally encoded frame data, such as P and B frame data, comprises motion vectors which point to reference blocks in a prior transmitted reference frame of video data, which has been stored in the frame store memory 212. The motion compensation block 310 analyzes each motion vector from the incoming temporally compressed data and retrieves a reference block from the frame store memory 212 in response to each motion vector. The motion compensation block 310 includes a local memory or on-chip memory 116 which stores the retrieved reference block. The motion compensation block 110 then uses this retrieved reference block to decompress the temporally compressed data.

In the preferred embodiment, the frame store memory 212 is 1M×16 SDRAM, such as Samsung KM416S1120AT-12, having an operating frequency of 81 MHz or 108 MHz and a burst size of 4 words. As discussed above, the frame store memory 112 is also used according to the present invention to store code and data for the transport logic 206 and the system controller logic 208.

Figure 5:
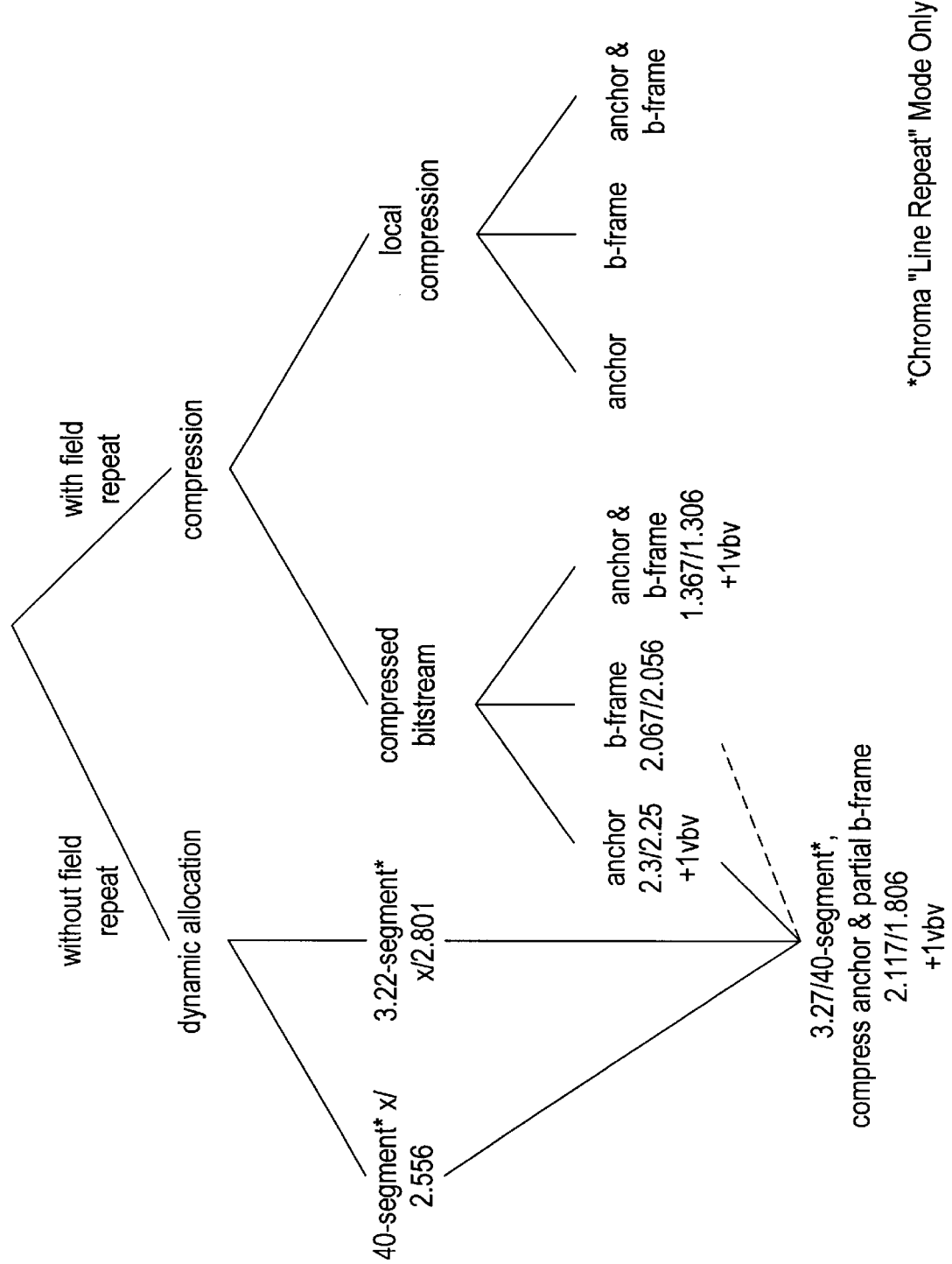
FIG. 5 illustrates various frame memory saving schemes used in various embodiments of the invention.

FIG. 5—Memory Saving Schemes

FIG. 5 illustrates various frame memory saving schemes used in various embodiments of the invention. As shown, in European systems which do not include a field repeat, dynamic memory segment allocation techniques are used to more efficiently use the memory space. In other words, memory segments or areas are dynamically allocated to minimize unused space. These dynamic memory segment allocation techniques range from a 40 segment technique (x/2.556) to a 3.22 (3) segment technique (x/2.801). As the memory segment size decreases, a larger amount of granularity is provided, and the memory can be used in a more "detailed" or specific fashion. The dynamic allocation scheme operates to dynamically allocate segments of memory of different size to more efficiently use the available memory and correspondingly result in little or no un-used space.

In U.S. systems with field repeat, compression techniques are preferably used to reduce memory requirements. These compression techniques include a "compressed bitstream" technique and a "local compression" technique.

The compressed bitstream technique operates to store frame data in its received MPEG compressed format, instead of storing the frame data in a decoded or decompressed format. When this compressed data is read from memory, the compressed memory is decoded or decompressed "on the fly". As shown, the compressed bitstream technique may involve storing only one of the anchor frames in a compressed format, storing only the B frames in a compressed format, or storing both the anchor and B frames in a compressed format.

The local compression technique comprises re-encoding the decoded or compressed bitstream, preferably using a standard compression standard such as DPCM or MPEG. Thus, once frames have been decoded or reconstructed, the frame data is re-encoded prior to storage in memory. As shown, the local compression may involve compressing one of the anchor frames only, the B frames only, or both the anchor and B frames.

FIGS. 6a and 6b—Memory Partitions

FIGS. 6A and 6B illustrate a table listing the memory partitions under different memory reduction schemes. As shown, the table of FIG. 1 illustrates the memory requirements for both the NTSC and PAL decoding schemes for a standard LSI L64005 part, a method which compresses the displayed anchor frame, a method which compresses both the anchor and the segment storing the B frame, a method which compresses only the B frame, and a method which compresses both the anchor and entire B frame. LSI part no. L64005 is a device produced by LSI Logic that has no memory reduction for NTSC and has dynamic allocation for PAL.

As shown, in the NTSC format using LSI part No. L64005, the frame store memory requires 12,441,600 bits of memory for storing three full frames. The channel buffer requires 2,864,637 bits of memory for various functions. As shown in the table, these functions include the vbv (video buffer verifier) buffer, the video non-instantaneous decode function, the video display sync function, the audio buffer, the audio-video latency difference function, the audio-display sync function, the video transport buffer, the audio transport buffer, and the jitter buffer (4 ms jitter at 15 Mbps). Each of the above functions collectively requires 2,864,637 bits for the channel buffer. The packet header overhead requires 20,000 bits of memory, the on-screen display (OSD) requires 675,840 bits of memory. This provides a subtotal for the software and data storage of 775,139 bits. The total required storage for the NTSC format is 16,777,216 bits of memory. As shown, the frame store and channel buffer collectively require 15,306,237 bits of memory.

As shown, the PAL decoding scheme using L64005 is similar. As shown the PAL decoding scheme requires 12,718,080 bits of memory to store 2.556 frames of memory. The channel buffer's subtotal for the PAL decoding scheme requires 3,060,847 bits of memory. The packet header overhead for the pal scheme is also 20,000 bits, and the onscreen display requires 808,192 bits. The subtotal for software and data storage in the PAL decoding scheme is 170,097 bits. Thus, the PAL decoding scheme using L64005 requires a total of 16,777,216 bits. As shown, for the PAL format, the frame store and channel buffer collectively require 15,778,927 bits of memory.

As shown, when the displayed anchor is compressed, the NTSC format requires 9,538,560 bits for the frame store, which is required to store the equivalent of 2.3 frames. The total for the frame store and channel buffer requirements is 14,208,205 bits, as well as 1,873,171 bits for the software and data. For the PAL decoding scheme with a compressed display anchor, 11,197,440 bits are required for the frame store. The frame store and channel buffer collectively require 16,063,295 bits, and the software and data requirement is (114,271). Thus, there are 114,271 bits "over budget" over a 16 Mbit target.

Where the anchor and the B segment are both compressed, for the NTSC decoding scheme, assuming 3.267 segments, the frame store is reduced to 8,778,240 bits and is required to store only 2.117 frames. Under this method, the frame store and channel buffer collectively require 13,447,885 bits of memory, and the subtotal for the software and data requirement is 2,633,491 bits of memory. In the PAL decoding scheme where the method compresses an anchor and segment B, assuming 40 segments, the frame store requires 8,985,600 bits and requires 1.806 frames to be stored. This method requires 13,851,455 bits to collectively store the frame store and channel buffer data, and the subtotal for software and data storage is 2,097,569 bits.

When the memory compresses only the B frame to optimize memory storage, in the NTSC format, the frame store required is 8,570,880 bits of memory and stores an equivalent of 2.067 frames. Under this method, the frame store and channel buffer require a total of 11,435,517 bits and a subtotal for software and data storage of 4,645,859 bits. In the PAL decoding scheme where the B frame only is compressed, the frame store requires 10,229,760 bits and thus stores 2.056 equivalent number of frames. In this method, the frames store and channel buffer collectively require 13,290,607 bits of memory, and the subtotal for software and data storage requires 2,658,417 bits of memory.

Where the system compresses both the anchor and the B frame to optimize memory, in the NTSC format, the frame store required is 5,667,840 bits of memory and stores an equivalent of 1.367 frames. Under this method, the frame store and channel buffer require a total of 10,337,485 bits and a subtotal for software and data storage of 5,743,891 bits. In the PAL decoding scheme where both the anchor frame and B frame are compressed, the frame store requires 6,497,280 bits and thus stores 1.306 equivalent number of frames. In this method, the frames store and channel buffer collectively require 11,363,135 bits of memory, and the subtotal for software and data storage requires 4,585,889 bits of memory.

Figure 7:
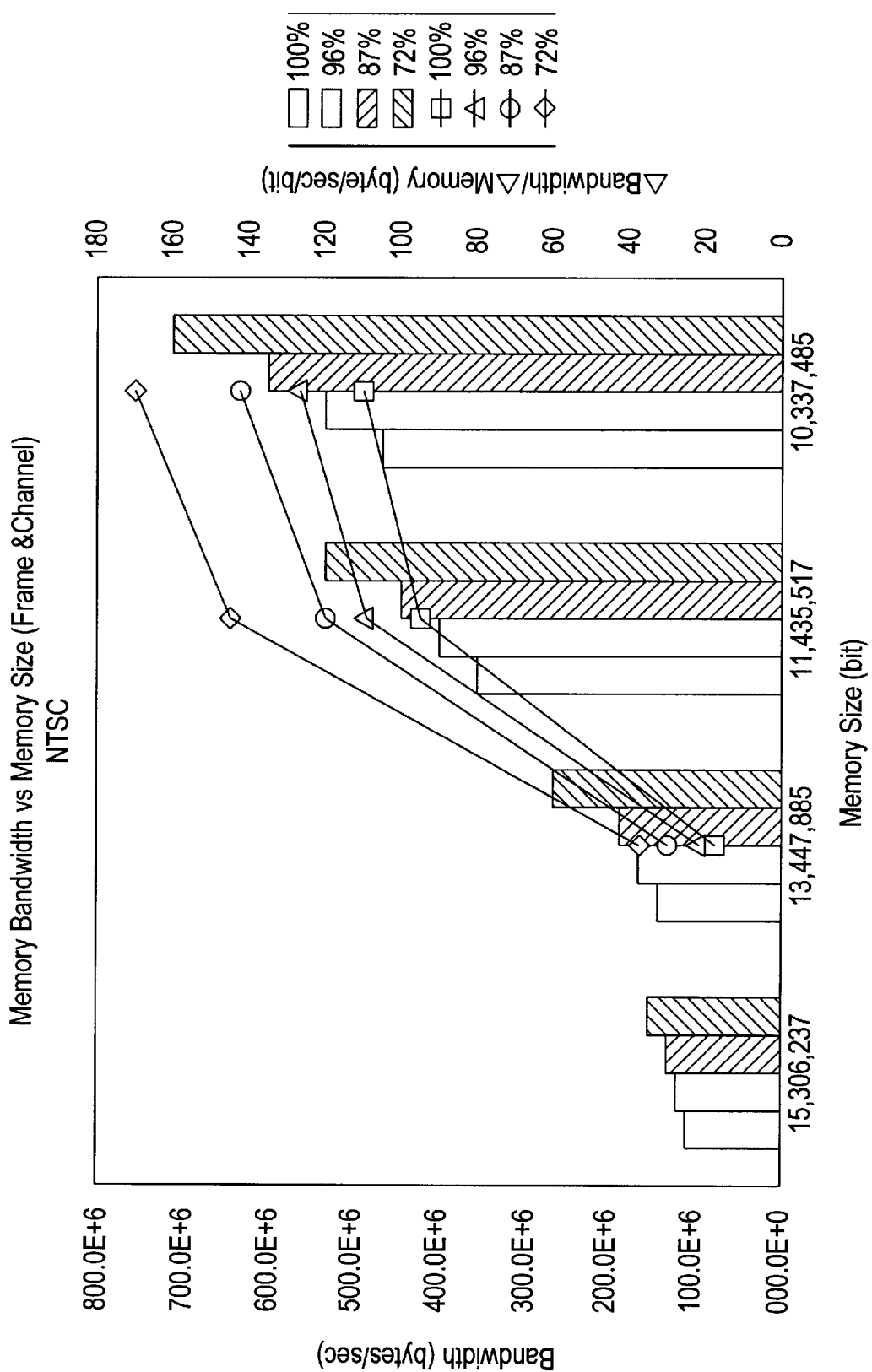
FIG. 7 illustrates the relationship of memory bandwidth vs. memory size in the NTSC decoding scheme.

FIG. 7—Memory Bandwidth vs. Memory Size in the NTSC Decoding Scheme

FIG. 7 illustrates the relationship of memory bandwidth vs. memory size in the NTSC decoding scheme. The memory size on the x axis of the graph is the memory size required for the frame store memory and the channel buffer. As shown, as the memory size decreases from left to right, the required amount of memory and/or processing bandwidth increases. Thus, a greater amount of memory transfer and/or processing bandwidth is required as the memory size is reduced. FIG. 7 illustrates four different plots for each memory size, where these plots comprise 100%, 96%, and 87%, and 72% of useable bandwidth. The various lines illustrated in the graph of FIG. 7 illustrate the change in bandwidth versus the change in memory size, i.e., the Δbandwidth/Δmemory, which comprises the units bytes/second/bit. As shown, the optimum memory size in the NTSC format is 13,447,885 bits.

Figure 8:
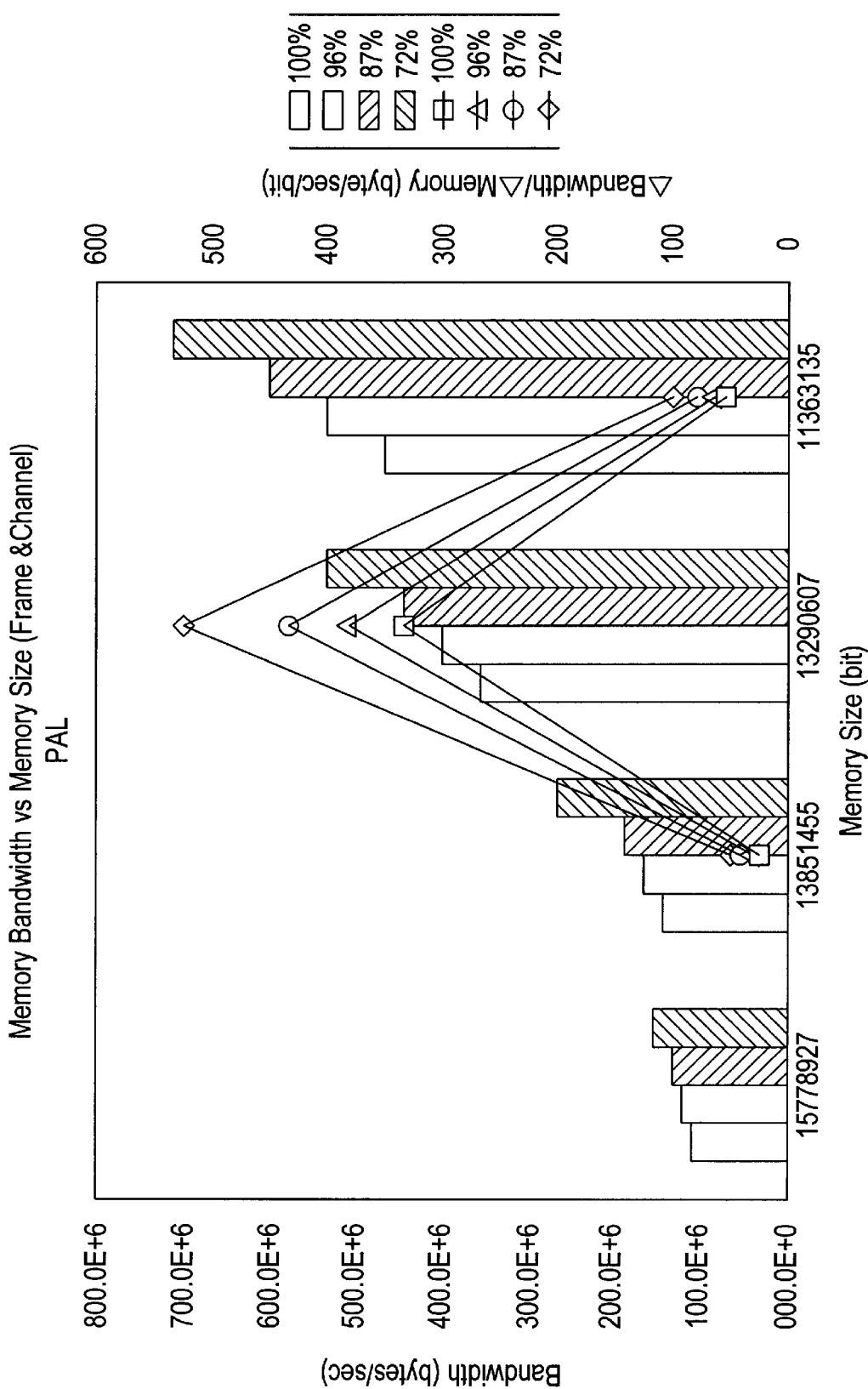
FIG. 8 illustrates the relationship of memory bandwidth vs. memory size in the PAL encoding scheme.

FIG. 8—Memory Bandwidth vs. Memory Size in the NTSC Decoding Scheme

FIG. 8 illustrates the relationship of memory bandwidth vs. memory size in the PAL decoding scheme. As with FIG. 7, the memory size on the x axis of the graph is the memory size required for the frame store memory and the channel buffer. As shown, as the memory size decreases from left to right, the required amount of memory and/or processing bandwidth increases. Thus, a greater amount of memory transfer and/or processing bandwidth is required as the memory size is reduced. FIG. 8 also illustrates four different plots for each memory size, where these plots comprise 100%, 96%, and 87%, and 72% of useable bandwidth. The various lines illustrated in the graph of FIG. 8 illustrate the change in bandwidth versus the change in memory size, i.e., the Δbandwidth /Δmemory, which comprises the units bytes/second/bit. As shown, the Δbandwidth/ Δmemory peaks at 13,851,455 bits, which is the optimum memory size in the PAL format.

FIG. 9—Memory Partitions

FIG. 9 illustrates the memory partitions of the external memory 212 for each of the NTSC and PAL encoding formats according to one embodiment of the invention. FIG. 9 illustrates the number of bytes of memory size allocated for different purposes in the unified memory 212, including number of bits for video frames, the vbv buffer, the video decode buffer, the video-display synch buffer, the audio buffer, the audio-video latency buffer, the audio-display synch buffer, the transport buffer, the jitter buffer, the PES header overhead memory, the OSD, and the system controller code and data storage. It is noted that FIG. 9 illustrates the memory partition according to one embodiment of the invention, and it is noted that the memory 212 may be allocated differently, as desired. As shown, the memory size requirement are substantially comparable. In this example, the NTSC format uses 10,583,248 bytes for storing video frames, and the PAL format uses 10,790,608 bytes for storing video frames.

FIG. 10—Decoding Memory Bandwidth

FIG. 10 illustrates the estimated memory bandwidth distribution in the preferred embodiment of the invention for the NTSC and PAL formats. FIG. 10 illustrates the estimated memory bandwidth distribution using the memory partition embodiment of FIG. 9. The estimated memory bandwidth distribution shown in FIG. 10 presumes a 16×1 MB SDRAM running at 100 MHz, wherein bandwidth is available at 200 MB per second. This memory bandwidth distribution also presumes a requirement of 20 Mbytes per second for code and data executed by the system controller 208 in the transport and system controller block 204. As noted above, the system controller 208 is preferably a MIPS RISC CPU. As shown, the NTSC scheme requires 160.19 MB per second bandwidth, whereas the PAL decoding scheme requires 157.18 MB per second of bandwidth. The bandwidth requirements for each of the NTSC and PAL formats are substantially comparable with the exception that the NTSC format requires a greater amount of memory bandwidth for the channel in/out function than does the PAL format.

Figure 11:
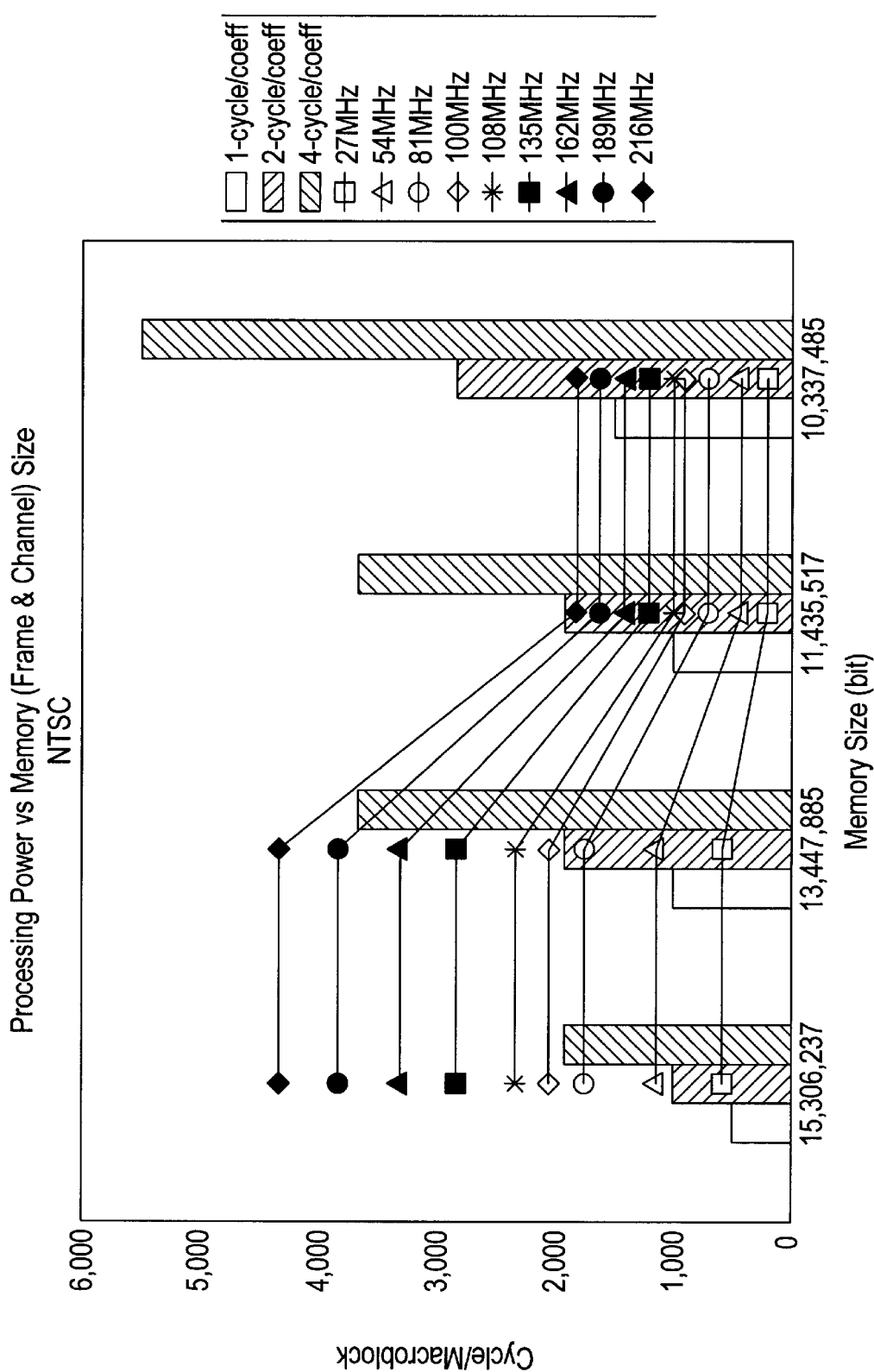
FIG. 11 illustrates the "worst case" relationship of processing power vs. memory size in the NTSC decoding scheme.

FIG. 11—Processing Power vs. Memory Size (NTSC)

FIG. 11 illustrates the "worst case" relationship of processing power vs. memory size in the NTSC decoding scheme. In FIG. 11, the lines represent available cycles per macroblock for a decoder operating at 27 to 216 MHz. The bars represent the required cycles per macroblock reconstructed for 1 to 4 cycle/coefficient throughput. For example, a 100 MHz decoder can operate with 13,447,885 memory points at 1 and 2-cycle/coefficient throughput only (not the slow 4-cycle/coefficient). However, as shown, the processing power tends to increase as the memory decreases in size from 13,447,885 bytes to 11,435,517 bytes. The 11,435,517 and 19,337,485 memory points require a large amount of processing power, and thus even 216 MHz processing speed is not sufficient with 2-cycle/coefficient throughput.

Figure 12:
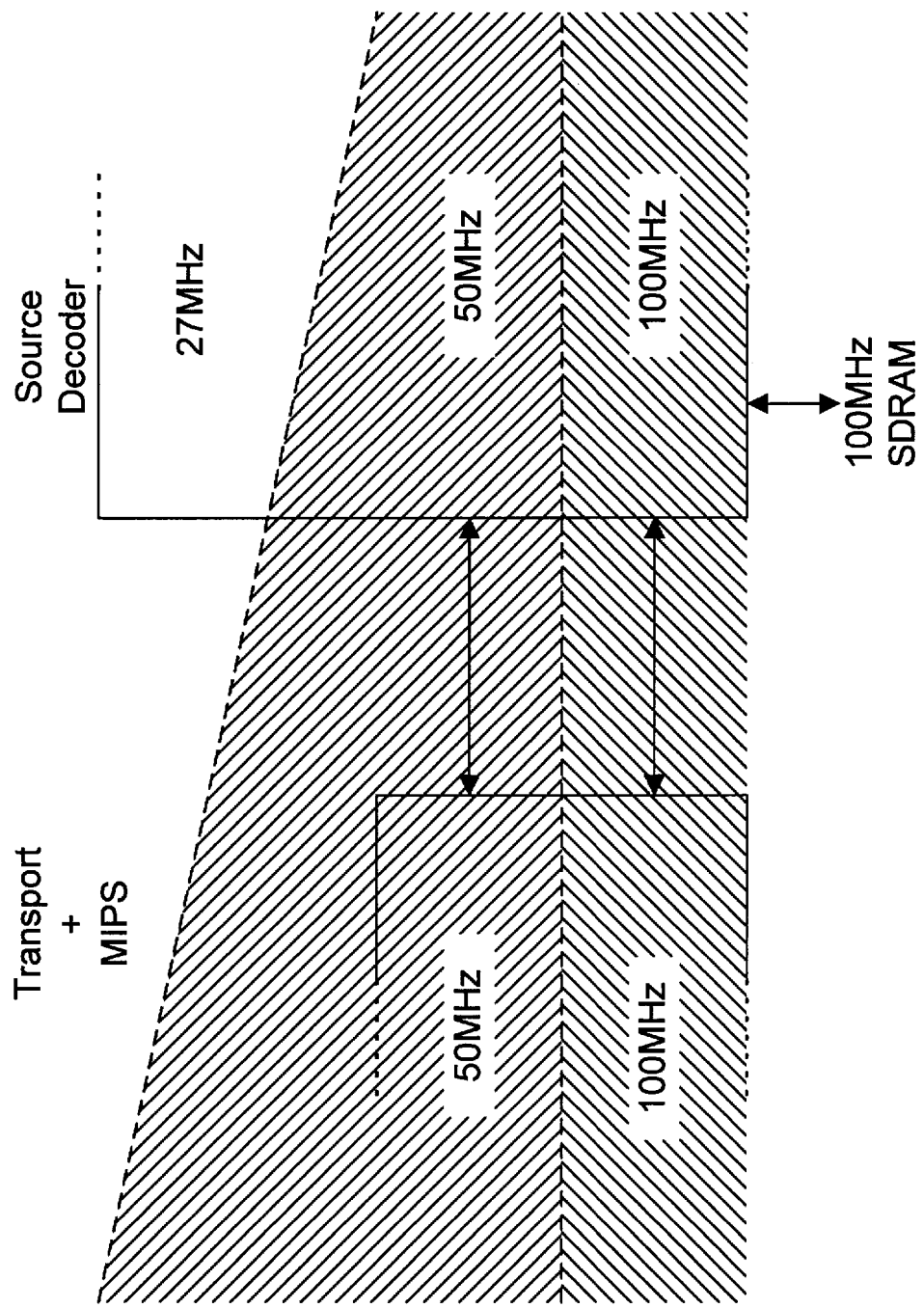
FIG. 12 illustrates the clock domains in the system.
Figure 13:
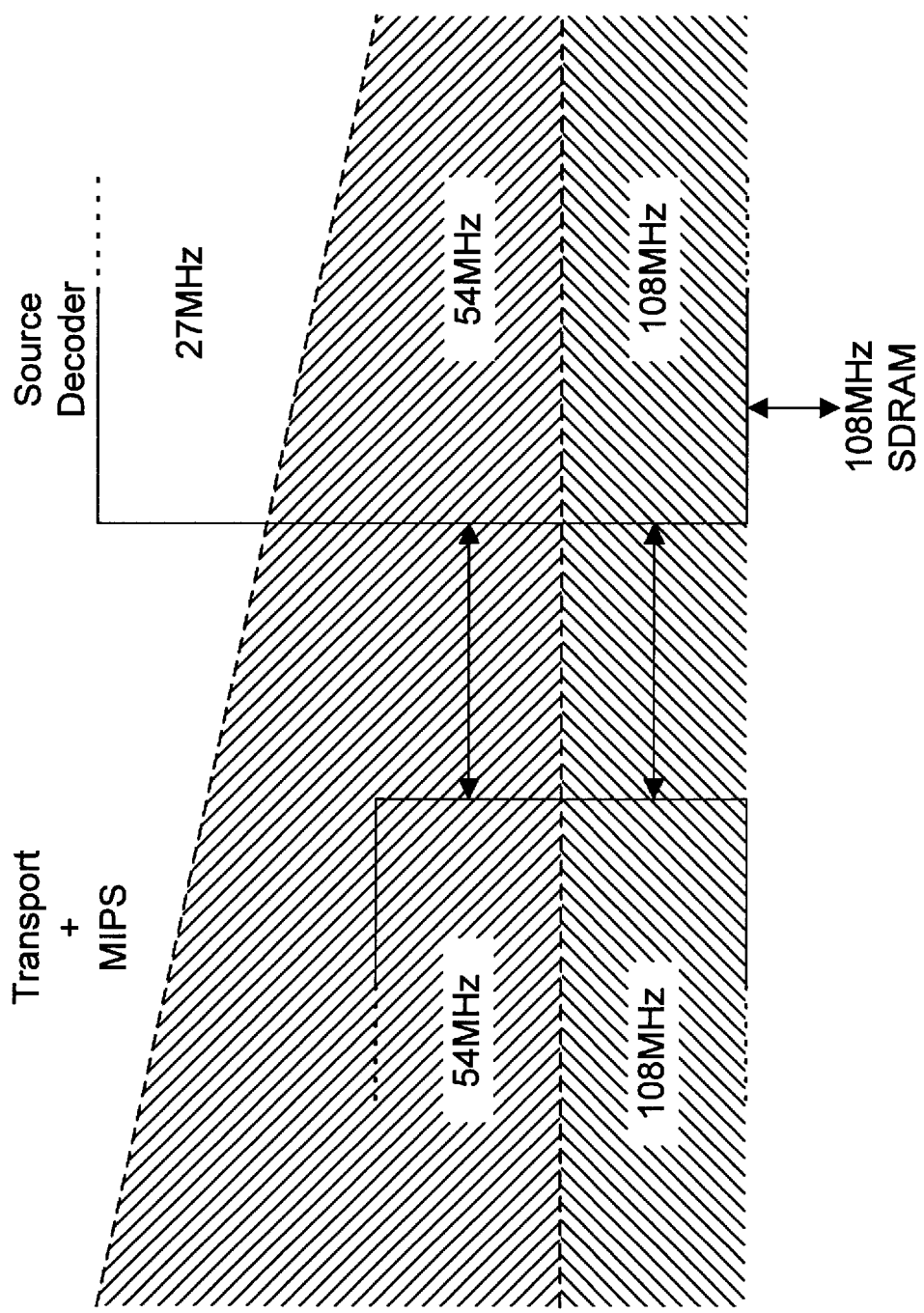
FIG. 13 illustrates clock operating frequencies according to the preferred embodiment of the invention.

FIGS. 12 and 13—Clock Domains

FIG. 12 illustrates the clock domains in the system, i.e., the various possible clock rates for the external memory 212 according to one embodiment of the invention. The video decoder system in the preferred embodiment includes a source decoder which operates at 27 Megahertz. The source decoder clock frequency of 27 Megahertz is required according to modern video encoding schemes. However, current memory operating frequencies are not designed for video applications, i.e., are not designed to operate at multiples of 27 MHz. As shown, the memory 212 operates near multiples of this source decoder frequency such as 50 MHz or 100 MHz.

FIG. 13 illustrates clock operating frequencies according to the preferred embodiment of the invention. In this embodiment, the external memory 212 is SDRAM or other suitable memory operating at 108 MHz, or a higher multiple. As shown, the transport and system controller block 204 preferably operates at either 54 MHz or 108 MHz. The source decoder 224 preferably also operates at 54 MHz or 108 MHz. Thus, as shown in FIG. 13, in the preferred embodiment the memory and hardware elements operate at multiples of the 27 MHz required clock frequency, i.e., either 54 Megahertz or 108 Megahertz.

Figure 14:
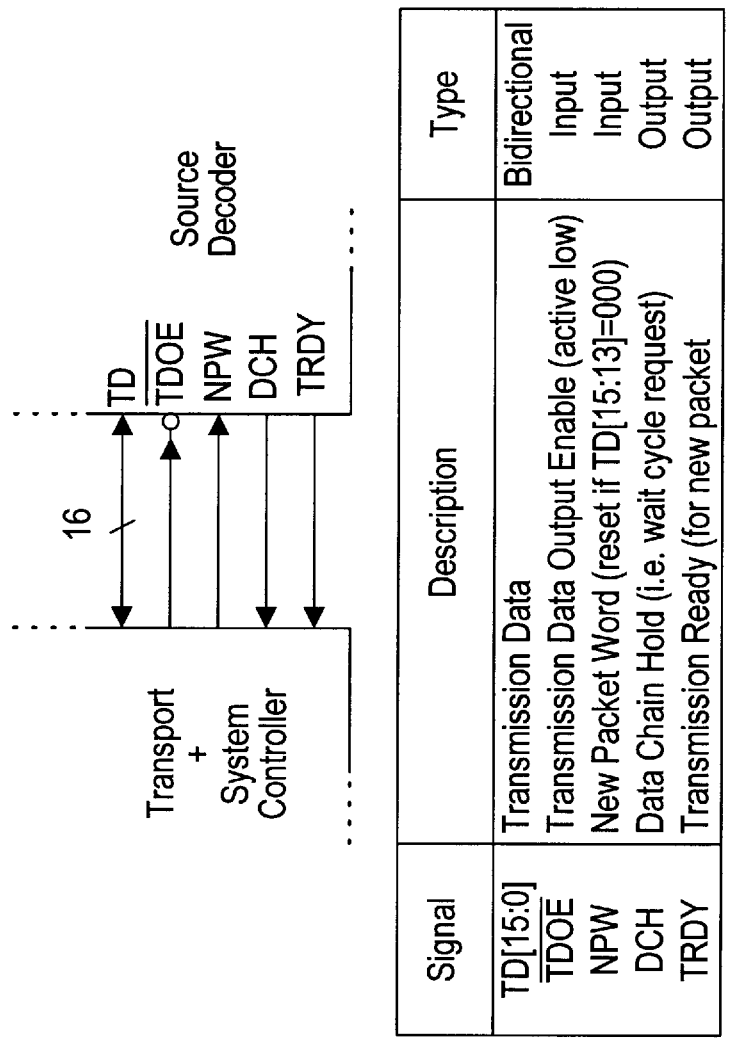
FIG. 14 illustrates an example of the packet data interface between the transport controller and the source decoder.

FIG. 14—Packet Data Interface

FIG. 14 illustrates an example of the packet data interface between the transport and system controller block 204 and the source decoder 224. As shown, the transport and system controller block 204 and the source decoder 224 communicate 16 bit transmission data, referred to as TD[15:0], in a bi-directional manner. The transmission data signals TD[15:0] comprise a data bus for transmitting data between the transport and system control logic 204 and the source decoder 224. The transport and system controller block 204 provides a transmission data output enable (TDOE) signal which is provided as an input to the source decoder 224. The transport and system controller block 204 also provides a new packet word (NPW) signal as an input to the source decoder 224. The source decoder 224 provides two outputs to the transport and system controller block 204, these being a data chain hold (DCH) signal, which is a wait cycle request, and a TRDY (transmission ready) signal which indicates that the logic is ready for a new packet.

Figure 15:
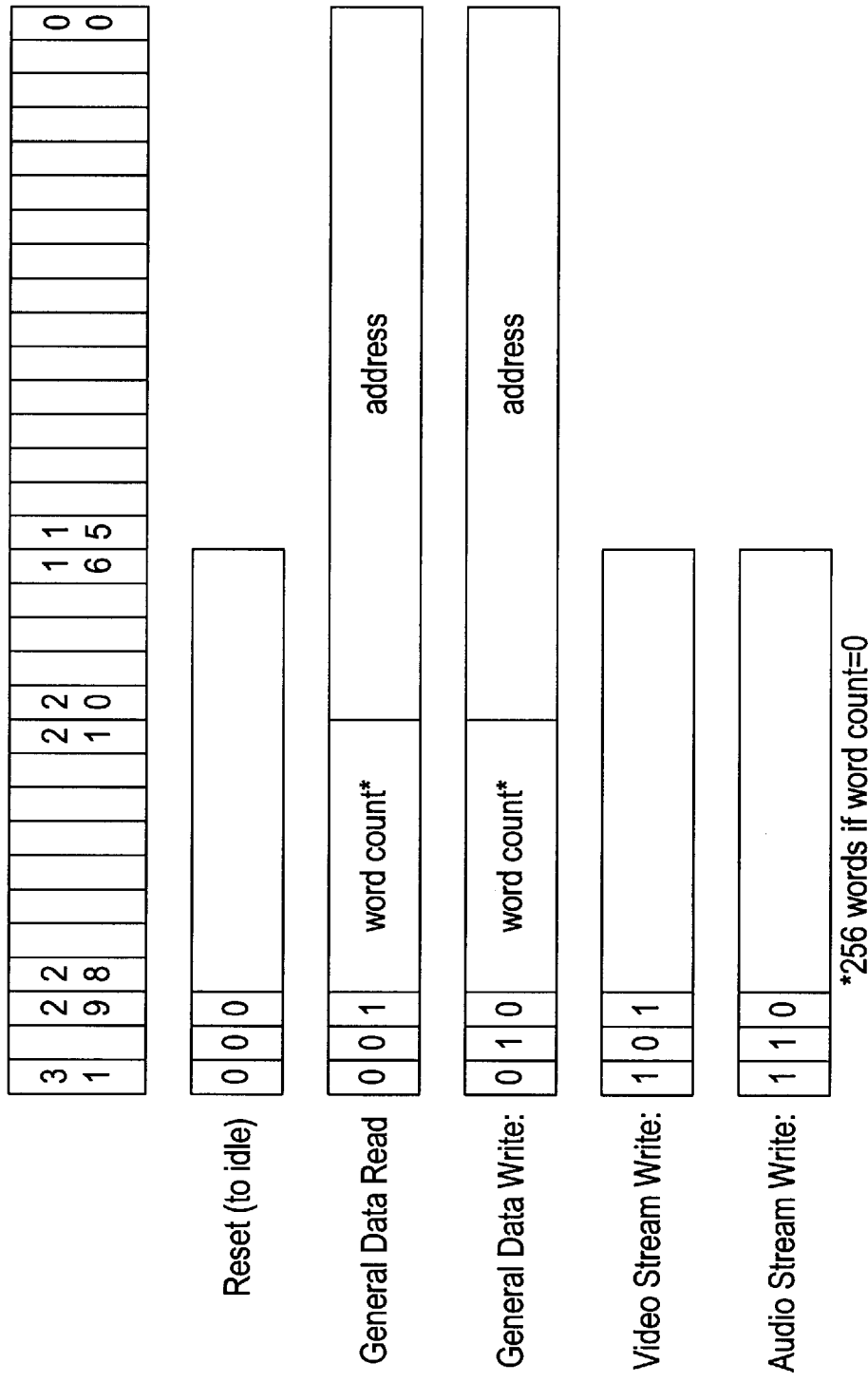
FIG. 15 illustrates packet header formats used in the preferred embodiment.

FIG. 15—Packet Header Formats

FIG. 15 illustrates packet header formats used in the preferred embodiment. As shown, different packet header values are used to indicate a reset, a general data read, a general data write, a video stream write, and an audio stream write. The general data read and general data write packets each include fields for word count and address.

Conclusion

Therefore, the present invention comprises a video decoder system and method which includes a single unified memory for MPEG transport, decode, and system controller functions. This reduces the required amount of memory, thus simplifying system design and reducing system cost.

Although the system and method of the present invention has been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

I claim:

1. An MPEG decoder system which includes a single memory for use by transport, decode and system controller functions, comprising:

a channel receiver for receiving and MPEG encoded stream;

transport logic coupled to the channel receiver which demultiplexes one or more multimedia data streams from the encoded stream;

a system controller coupled to the transport logic which controls operations within the MPEG decoder system;

an MPEG decoder coupled to receive one or more multimedia data streams output from the transport logic, wherein the MPEG decoder operates to perform MPEG decoding on the multimedia data streams; and a memory coupled to the MPEG decoder, wherein the memory is used by the MPEG decoder during MPEG decoding operations, wherein the memory stores code and data useable by the system controller which enables the system controller to perform control functions within the MPEG decoder system, wherein the memory is used by the transport logic for demultiplexing operations;

wherein the MPEG decoder is operable to access the memory during MPEG decoding operations;

wherein the transport logic is operable to access the memory to store and retrieve data during demultiplexing operations; and wherein the system controller is operable to access the memory to retrieve code and data during system control functions.

2. The MPEG decoder system of claim 1, wherein the MPEG decoder includes a memory controller coupled to the memory;

wherein the transport logic is coupled to the memory controller and is operable to access the memory through the memory controller; and wherein the system controller is coupled to the memory controller and is operable to access the memory through the memory controller.

3. The MPEG decoder system of claim 2, wherein the memory controller is operable to store compressed data in the memory to reduce memory storage requirements.

4. The MPEG decoder system of claim 2, wherein the memory controller is operable to dynamically allocate segments of memory space in the memory to optimize memory use.

5. The MPEG decoder system of claim 1, wherein the memory stores anchor frame data during reconstruction of temporally compressed frames.

6. The MPEG decoder system of claim 1, wherein said memory has a memory size which does not exceed 16 Mbit.

7. The MPEG decoder system of claim 1, wherein said memory includes a plurality of memory portions, wherein said memory includes a video frame portion for storing video frames, a system controller portion for storing code and data executable by the system controller, and a transport buffer portion for storing data used by the transport logic.

8. The MPEG decoder system of claim 7, wherein said memory further includes a video decode buffer portion for storing decoded video data, a video display sync buffer, and an on-screen display buffer.

9. The MPEG decoder system of claim 8, wherein said memory further includes one or more audio buffers for storing audio data.

10. A method for performing video decoding in an MPEG decoder system which includes a single memory for use by transport, decode and system controller functions, the method comprising:

receiving an MPEG encoded stream;

demultiplexing one or more multimedia data streams from the encoded stream, wherein said demultiplexing one or more multimedia data streams from the encoded stream operates using a first unified memory;

performing MPEG decoding on the multimedia data streams, wherein said performing MPEG decoding operates using said first unified memory; and a system controller controlling operations within the MPEG decoder system, wherein said controlling operations accesses code and data from said first unified memory;

wherein said demultiplexing one or more multimedia data streams, said performing MPEG decoding, and said controlling operations each use said first unified memory.

11. The method of claim 10, wherein said demultiplexing one or more multimedia data streams from the encoded stream includes accessing multimedia data stream data from said first unified memory;

wherein said performing MPEG decoding on the multimedia data streams includes accessing video frame data from said first unified memory; and wherein said controlling operations includes accessing code and data from said first unified memory.

12. The method of claim 11, wherein the MPEG decoder system includes a memory controller coupled to the first unified memory;

wherein said accessing multimedia data stream data from said first unified memory comprises accessing said multimedia data stream data through the memory controller;

wherein said accessing video frame data from said first unified memory comprises accessing said video frame data through the memory controller; and wherein said accessing code and data from said first unified memory comprises accessing said code and data through the memory controller.

13. The method of claim 10, wherein the MPEG decoder system includes a memory controller coupled to the first unified memory, the method further comprising:

the memory controller storing compressed data in the first unified memory to reduce memory storage requirements.

14. The method of claim 10, wherein the MPEG decoder system includes a memory controller coupled to the first unified memory, the method further comprising:

the memory controller dynamically allocating segments of memory space in the first unified memory to optimize memory use.

15. The method of claim 10, wherein said first unified memory has a memory size which does not exceed 16 Mbit.

16. A video decoder system which includes a single memory for use by transport, decode and system controller functions, comprising:

a channel receiver for receiving an encoded video stream;

transport logic coupled to the channel receiver which demultiplexes one or more multimedia data streams from the encoded stream;

a system controller coupled to the transport logic which controls operations within the video decoder system;

a video decoder coupled to receive one or more multimedia data streams output from the transport logic, wherein the video decoder operates to perform video decoding on the multimedia data streams; and a memory coupled to the video decoder, wherein the memory is used by the video decoder during video decoding operations, wherein the memory stores code and data useable by the system controller which enables the system controller to perform control functions within the video decoder system, wherein the memory is used by the transport logic for demultiplexing operations;

wherein the video decoder is operable to access the memory during video decoding operations;

wherein the transport logic is operable to access the memory to store and retrieve data during demultiplexing operations; and wherein the system controller is operable to access the memory to retrieve code and data during system control functions.

17. The video decoder system of claim 16, wherein the video decoder includes a memory controller coupled to the memory;

wherein the transport logic is coupled to the memory controller and is operable to access the memory through the memory controller; and wherein the system controller is coupled to the memory controller and is operable to access the memory through the memory controller.

18. The video decoder system of claim 17, wherein the memory controller is operable to store compressed data in the memory to reduce memory storage requirements.

19. The video decoder system of claim 17, wherein the memory controller is operable to dynamically allocate segments of memory space in the memory to optimize memory use.

20. The video decoder system of claim 16, wherein said memory has a memory size which does not exceed 16 Mbit.

* * * * *